United States Patent [19]
Chaug

[11] Patent Number: 5,943,196
[45] Date of Patent: *Aug. 24, 1999

[54] APPARATUS FOR SECURING A THIN FILM MAGNETIC TAPE HEAD CLOSURE USING A C-CORE TO INTERCONNECT GLUING VIAS

[75] Inventor: Yi-Shung Chaug, Boulder, Colo.

[73] Assignee: Storage Technology Corporation, Louisville, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/846,864

[22] Filed: May 1, 1997

[51] Int. Cl.$^6$ ........................................... G11B 5/29
[52] U.S. Cl. ........................................ 360/126; 29/603.21
[58] Field of Search ................... 360/126, 121, 360/127; 29/603.21

[56] References Cited

U.S. PATENT DOCUMENTS

| | | | |
|---|---|---|---|
| 4,967,299 | 10/1990 | Katoh et al. | 360/121 |
| 5,022,140 | 6/1991 | Tsutaki et al. | 29/603.21 |
| 5,113,299 | 5/1992 | Onoe | 360/126 |
| 5,513,057 | 4/1996 | Zieren et al. | 360/122 |
| 5,539,598 | 7/1996 | Denison et al. | 360/113 |
| 5,636,433 | 6/1997 | Kang | 29/603.21 |

*Primary Examiner*—Robert S. Tupper
*Attorney, Agent, or Firm*—Duft, Graziano & Forest, P.C.

[57] ABSTRACT

A method and apparatus including gluing vias in the closure surface and/or the recording module surface to increase bonding strength of the closure to the recording module. The surface of the recording module has a nonplanar topography along a gap side surface which creates localized air space in the gap. When adhesive is introduced between the closure and the recording module, the adhesive flows into these air spaces to bond the surfaces. The invention utilizes gluing vias in the surfaces of the closure and/or the recording module to increase flow of the adhesive and improve bonding strength.

10 Claims, 5 Drawing Sheets

APPARATUS FOR SECURING A THIN FILM MAGNETIC TAPE HEAD CLOSURE USING A C-CORE TO INTERCONNECT GLUING VIAS

BACKGROUND OF THE INVENTION

1. Field of the Invention

The invention relates to the field of dynamic magnetic information storage and retrieval. More particularly, the invention relates to a magnetic recording head. In still greater particularity, the invention relates to a method and apparatus for securing a closure to a recording module. By way of further characterization, but not by way of limitation thereto, the invention utilizes gluing vias in the closure and or in the recording module to strengthen the bond therebetween.

2. Description of the Related Art

There has been a great demand for increasing the data throughput of magnetic tape transport systems used in conjunction with high-speed digital computers. In order to utilize the high-speed capabilities of these computers, it is necessary to increase the amount of data stored on a magnetic tape and to increase the speed at which the data is written to or retrieved from the magnetic tape media.

To increase the data storage capacity of the tape transport systems, the areal density of the magnetic tape media which stores the data must be increased. Areal density is defined as the number of units of data stored in a unit area of the tape. Areal density is characterized by two attributes: linear density and track density. To increase the areal density of a magnetic tape media, one must increase either or both, the linear density and track density of the magnetic tape.

Track density is defined as the number of data tracks per unit width of magnetic tape. Two characteristics associated with track density are track width, defined as the actual width of an individual data track; and track pitch, defined as the distance from the center of one data track to the center of a neighboring data track. As magnetic tape head size decreases, the track pitch and track width are decreased, thereby increasing track density.

With high track density magnetic recording heads such as in the 36-track system, because the distance between data tracks is reduced, slight imperfections in the heads will have a more significant impact on the performance and/or the quality of the tape heads. Naturally, a small imperfection in a small area will have a greater impact and be more significant than the same small imperfection in a larger area.

In magnetic recording heads, especially magneto-resistive thin-film tape heads, a gap length between a substrate and a closure is one of the critical parameters in determining the recording performance of the tape head. Bonding the closure and the recording module affects the gap which is critical to the performance of the head. When an adhesive is introduced between the recording module and the closure, an insufficient bond will result in a condition known in the art as "gap slip". Gap slip allows shifting of the closure with respect to the recording module and results in significant yield problems in tape head manufacturing. The occurrence of gap slip during head operation would also deteriorate the head recording performance and head life.

The substrate has read and/or write tracks deposited on and extending from a gap side surface of the substrate to form the recording module which has a nonplanar topography due to the deposition of the structured thin film layers. The recording module is bonded to the flat surface on the closure. After bonding the closure and the recording module, the tape head is ground and lapped such that a smooth contoured surface is obtained.

SUMMARY OF THE INVENTION

The invention utilizes gluing vias in the closure surface and/or the recording module surface to increase bonding strength of the closure to the recording module to thereby improve tape head performance and longevity. The tape head of the present invention has a substrate and a closure separated by a gap. The surface of the recording module has a nonplanar topography along a gap side surface which creates localized air space in the gap. When adhesive is introduced between the closure and the recording module, the adhesive flows into these air spaces to bond the surfaces. The invention utilizes gluing vias in the surfaces of the closure and/or the recording module to increase flow of the adhesive between these surfaces and improve bonding strength. The present invention further relates to a method of making a multi-track tape head for at least one of reading from and writing to a medium. The method comprises the steps of: (1) forming a recording track on a substrate, whereby the substrate has a first nonplanar topography along a gap side surface of the substrate; (2) adding gluing vias on the substrate and/or the closure; (3) machining a C-core on a gap side surface of the closure; and (4) bonding the substrate and the closure together by introducing adhesive into the C-core.

The present invention overcomes the problems associated with gap slip and increases manufacturing yield. The present invention also reduces or eliminates performance problems and reduced head useful life due to gap slip.

BRIEF DESCRIPTION OF THE DRAWINGS

The present invention will be described with reference to the accompanying drawings.

DESCRIPTION OF THE PREFERRED EMBODIMENT

Figure 1:
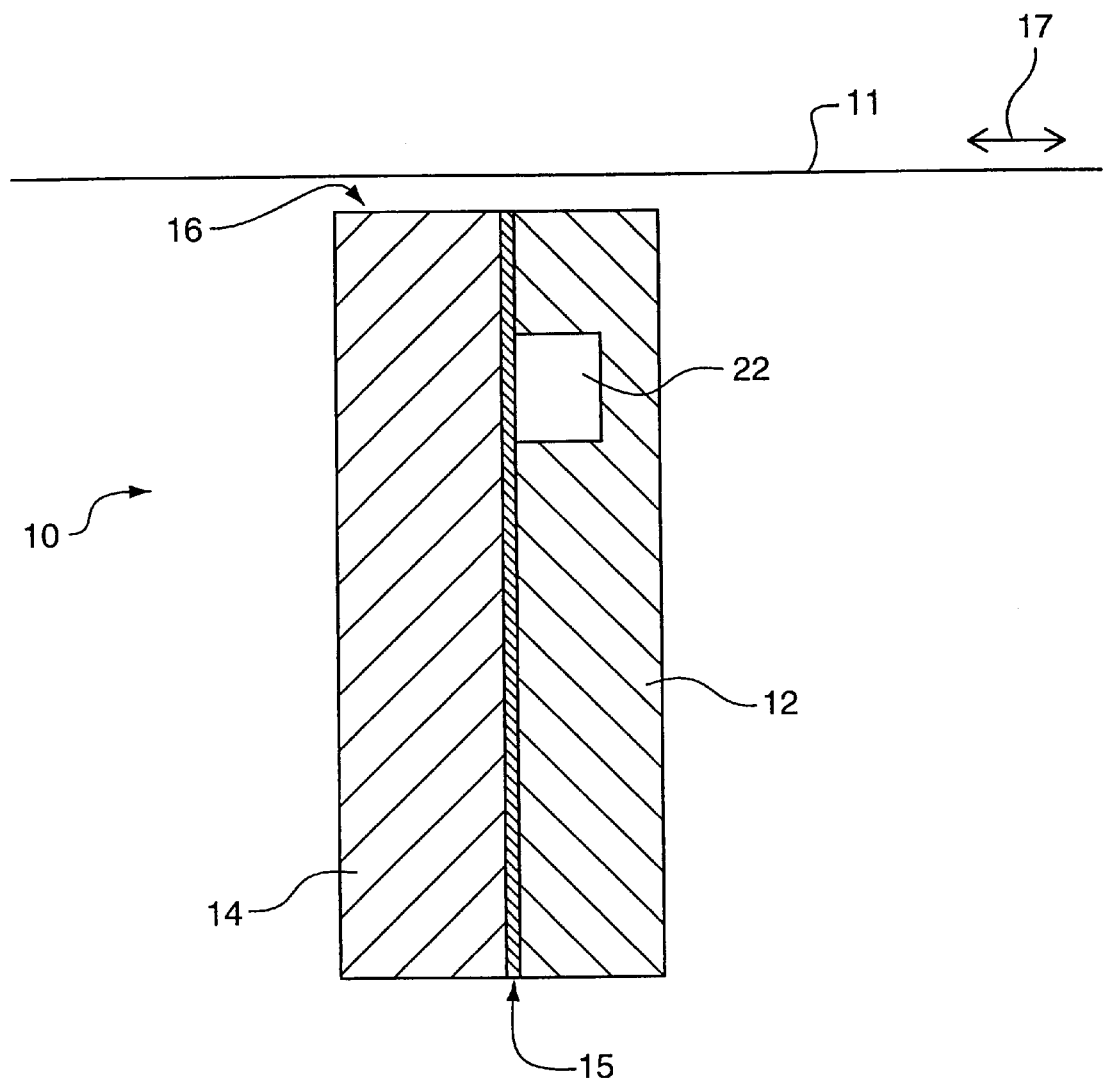
FIG. 1 is a cross-sectional view of the magnetic tape head and medium in accordance with the present invention.

The invention relates to a magnetic tape head 10 as shown generally in cross section in FIG. 1. Tape head 10 includes a closure 12 and a substrate 14 separated by a gap 15. A medium such as a magnetic recording medium or a magnetic tape 11 passes over a front end 16 of tape head 10. A magnetic field at front end 16 of gap 15 enables data to be read from and written to the medium. Movement of the magnetic tape along the front end 16 of tape head 10 is illustrated by bidirectional arrow 17.

Figure 2:
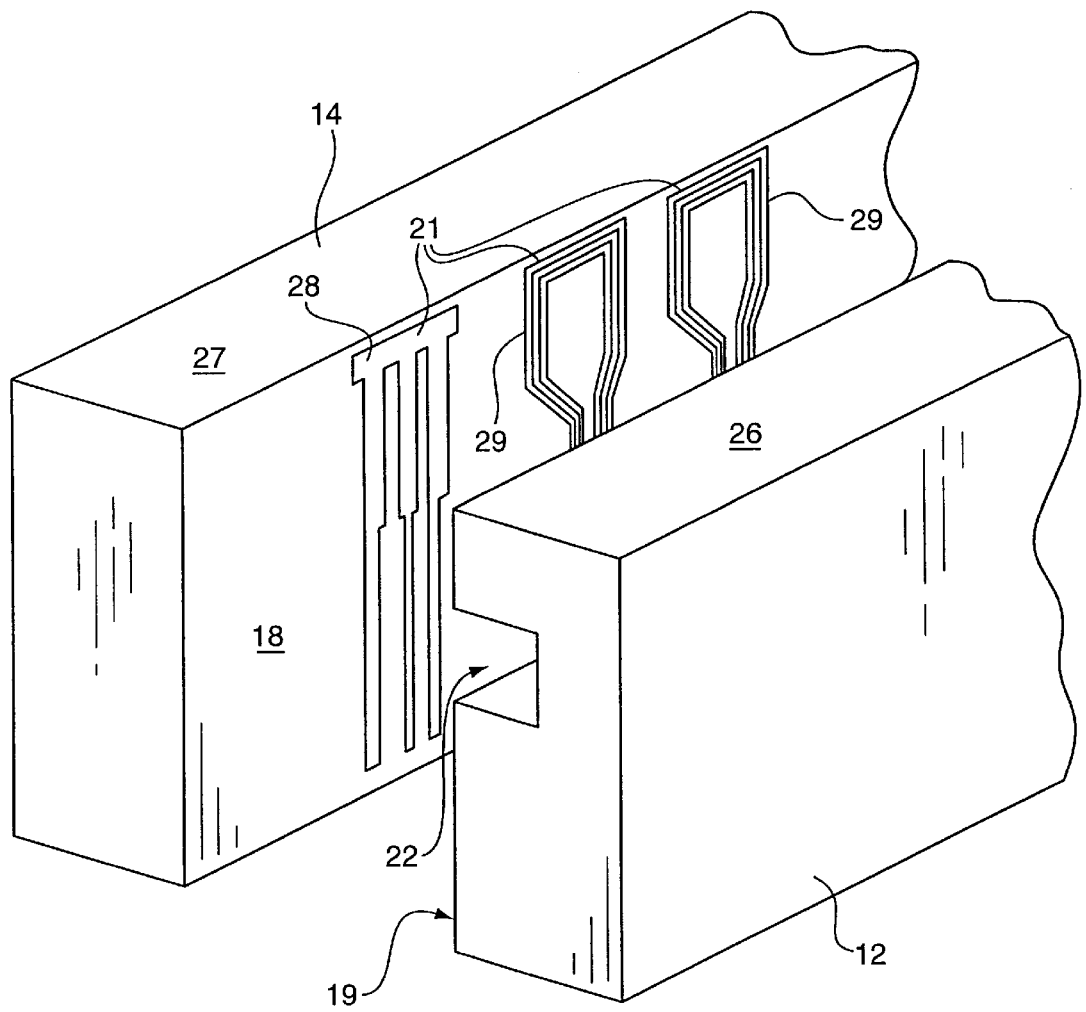
FIG. 2 is an isometric view of the magnetic head of the present invention where the closure is separated from the substrate.

For purposes of illustration and the following discussion, FIG. 2 shows closure 12 separated from substrate 14. In a final configuration, closure 12 is bonded to substrate 14 such that closure 12 and substrate 14 are separated by gap 15. Gap 15 is defined between a gap side surface 18 of substrate 14 and a gap side surface 19 of closure 12. Gap 15 has a thickness that is equal to the amount of separation between gap side surface 18 of substrate 14 and gap side surface 19 of closure 12. The thickness of gap 15 is substantially equal to the thickness of deposited thin film layers 21. Thin film layers 21 represent read or record tracks deposited on substrate 14 as is known in the art.

Closure 12 serves a generally mechanical function in tape head 10 and is intended to be bonded with substrate 14. To improve the bonding between substrate 14 and closure 12, closure 12 includes a C-core 22. Specifically, C-core 22 is machined in gap side surface 19 of closure 12 so that an adhesive can be introduced into the C-core and flow between substrate 14 and closure 12, thereby improving the bond between substrate 14 and closure 12.

As shown, closure 12 is comprised of magnetic material which may be, for example, ferrite. Closure module 12 includes a top surface 26 at a front end of tape head 10 for being disposed adjacent to the medium. Gap side surface 19 of closure 12 is disposed on a side of closure 12 adjacent to gap 15. Gap side surface 19 of closure 12 is substantially flat and defines a planar surface.

Substrate 14 as shown is of a generally block-shaped configuration. Substrate 14 has a top surface 27 at the front end of tape head 10 for being disposed adjacent to tape 11. Gap side surface 18 of substrate 14 is disposed on a side of substrate 14 adjacent to gap 15. Gap side surface 19 of substrate 14 is substantially flat and defines a planar surface prior to the deposition of thin film layers 21 on surface 18 of module 14. Thin film layers 21 include a recording track layer comprising, for example, read tracks 28 and/or write tracks 29. Read tracks 28 and write tracks 29 are deposited and patterned on substrate 14 in accordance with conventional thin film deposition techniques.

Read tracks 28 have a thickness which is approximately equal to the thickness of gap 15 as shown. Write tracks 29 have a thickness which is less than the thickness of read tracks 28. The variation in the thickness between read tracks 28 and write tracks 29 result in a nonplanar topography for recording track side surface 18 after film layers 21 have been deposited. Thus after substrate 14 and closure 12 are bonded together, spaces exist between write tracks 29 and gap side surface 19 of closure 12.

The nonplanar topography surface 18 of recording module 14 results from the deposition of structured thin film layers 21 which may include read tracks 28 and write tracks 29. Surface 19 of closure 12 has a flat surface 19 with a machined C-core 22. As closure 12 is bonded to module 14 in the closing process, an adhesive is introduced into the C-core. The adhesive is preferably a low viscosity thermal curing adhesive such as Able-931-1 available from Ablestik Corp. It should be expressly understood, however, that other adhesives may be used without departing from the scope of the invention. The adhesive from the C-core flows through capillaries created between the surfaces 18 and 19 of the recording module and the closure respectively. These capillaries are created by the difference in thickness of the read tracks 28 and write tracks 29 deposited on surface 18. The amount of adhesive wicking into the area between surfaces 18 and 19 is dependent upon the difference in thickness of the read tracks 28 and write tracks 29. If the difference between these thickness is small, then the amount of wicking is small and the bond between module 14 and closure 12 is weak. For example, it has been found empirically that, if the difference in thickness between read tracks 28 and write tracks 29 is less than 50 nm, then the bond strength between closure 12 and recording module 14 is weak. During head manufacturing, shipping, and operation of the head a weak bond will generate a shift or slippage between closure 12 and module 14. This shift or slippage is referred to as gap slip. Gap slip is a significant problem in tape head manufacturing and also results in deterioration of head recording performance and head life.

Figure 3:
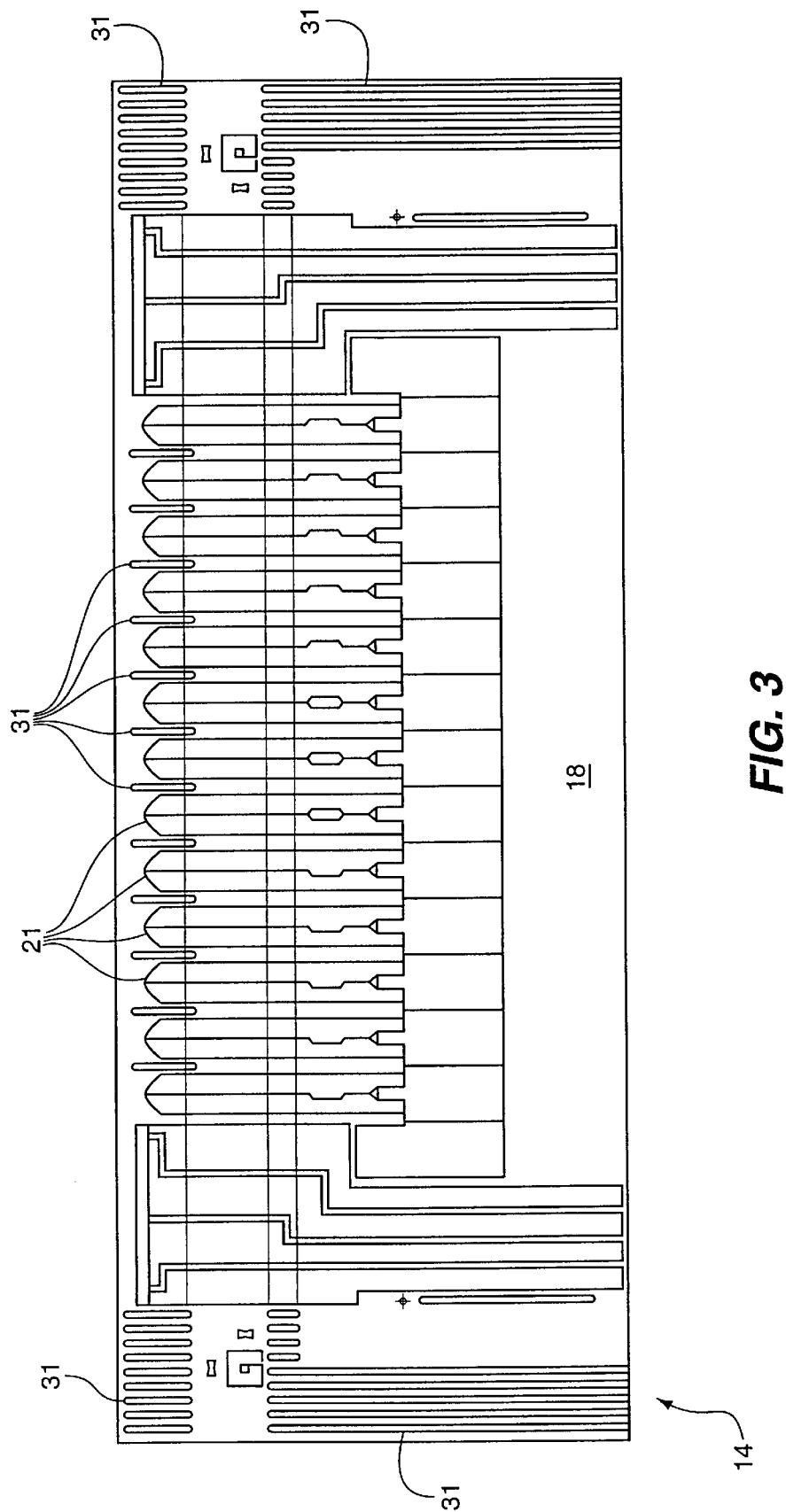
FIG. 3 is a view of side surface 18 of the substrate including gluing vias according to the present invention.
Figure 4:
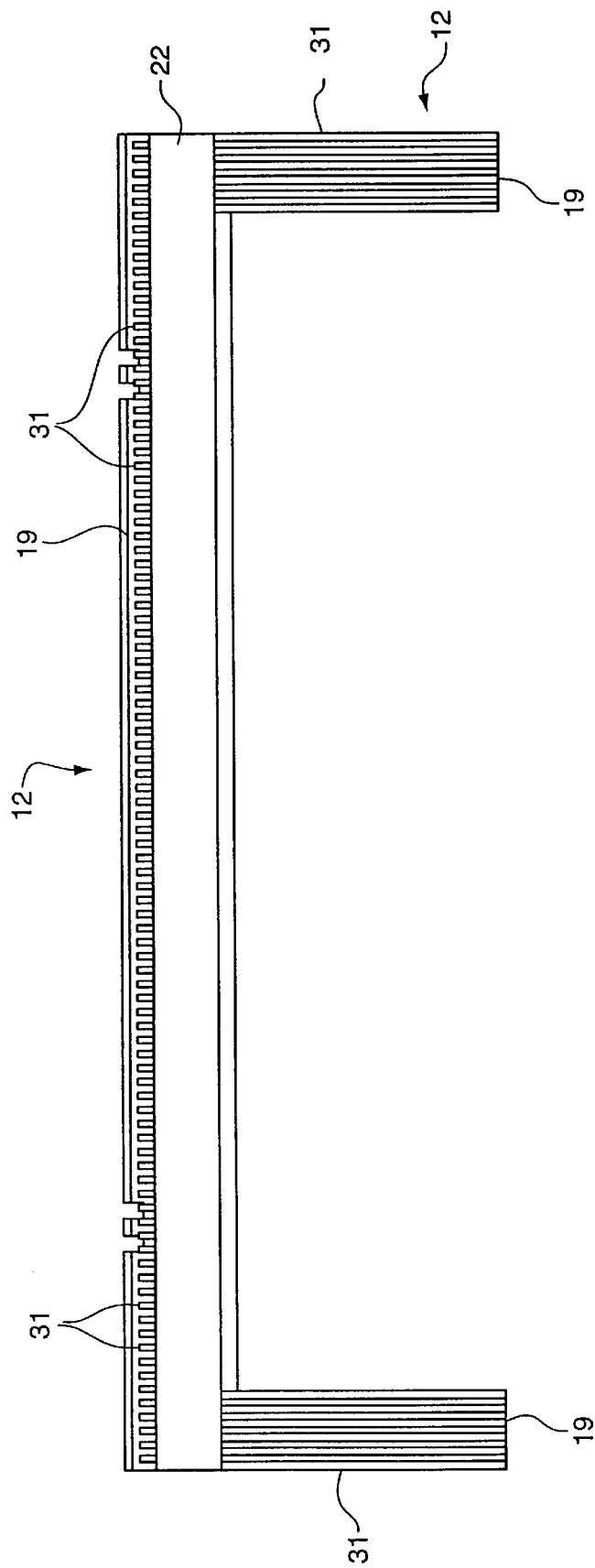
FIG. 4 is a view of side surface 19 of the closure including gluing vias according to the present invention.

Referring to FIGS. 3 and 4, the present invention adds gluing vias on surface 18 and/or 19 to improve adhesive flow from C-core 22 between surfaces 18 and 19. That is, gluing vias 31 enhance the adhesive flow through capillaries between surfaces 18 and 19 resulting in a substantial increase in the adhesive wicking area. Gluing vias 31 make bond strength less dependent on the surface topology of recording module 14.

Referring to FIG. 3, gluing vias 31 are shown on surface 18 of substrate 14. Vias 31 can be included between structured thin film layers 21 if the distance between adjacent layers 21 (track to track distance) is more than 100 um. Vias 31 are photolithographically defined and subsequently trenched to create the desired pattern. The width and depth of gluing vias 21 in the preferred embodiment is at least 100 um and 0.5 um respectively. It should be expressly understood however, that these dimensions may be varied as desired and the claimed invention should not be limited to these dimensions.

In a tape head where the track to track distance on surface 18 is less than 100 um, gluing vias 21 may be included on surface 19 of closure 12 as shown in FIG. 4. Vias of width and depth 100 um and 0.5 um respectively may be photolithographically defined and trenched at equally spaced distances from one another. As stated previously, it should be expressly understood however, that these dimensions and spacing may be varied as desired and the claimed invention should not be limited to these dimensions or spacing. Of course, it may also be desirable to include vias on both surfaces 18 and 19 to increase bonding strength.

Figure 5:
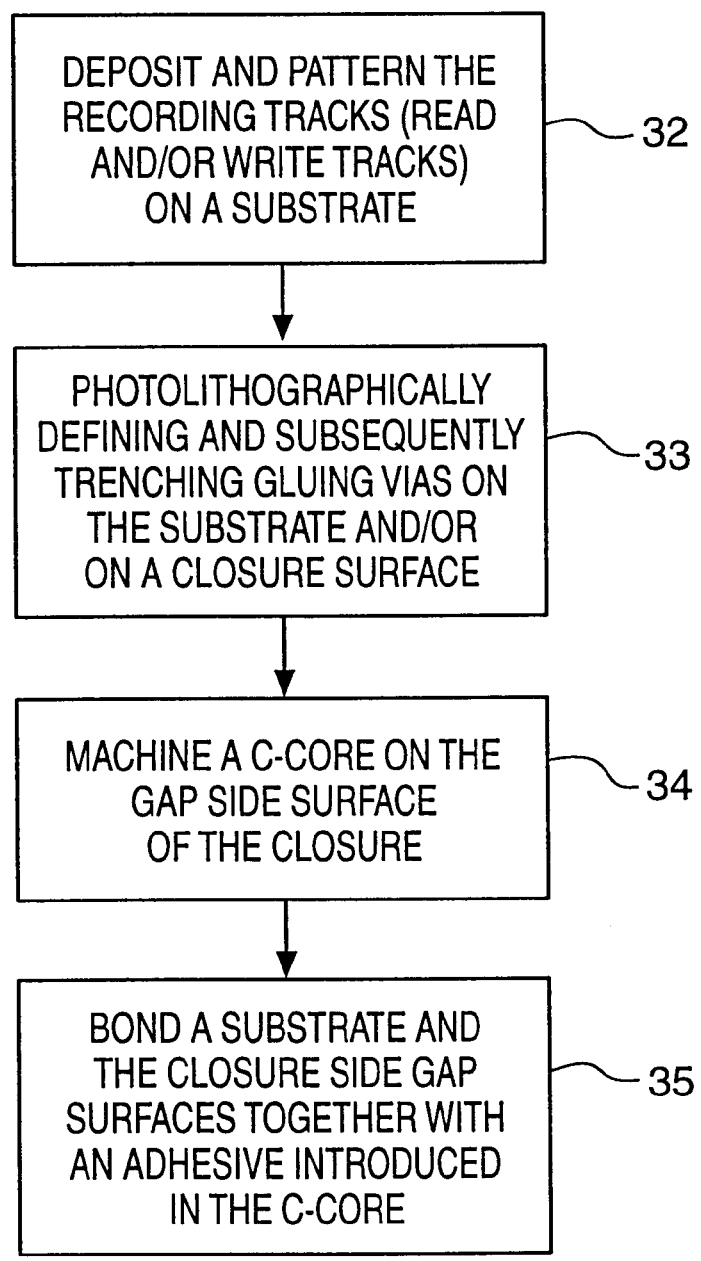
FIG. 5 shows steps for producing a tape head in accordance with the present invention.

FIG. 5 illustrates the steps of manufacturing tape head 10 in accordance with the present invention. In step 32, a recording track layer 16 is deposited and patterned in accordance with conventional thin film deposition techniques such as vacuum deposition to form read tracks 28 and/or write tracks 29. Of course, read tracks 28 and write tracks 29 may be deposited on substrate 14 either before or after closure 12 is manufactured in accordance with the present invention. In step 33, gluing vias are photolithographically defined and subsequently trenched in ether or both the substrate and closure. In step 34, the C-core is machined on the closure surface. Finally, in step 35, the closure and substrate are bonded together with adhesive introduced into the C-core. In accordance with the invention, the adhesive flows into the gluing vias thereby increasing the bond strength of the tape head.

While advantageous embodiments have been chosen to illustrate the invention, it will be understood by those skilled in the art that various changes and modifications can be made therein without departing from the scope of the invention as defined in the appended claims. For example, although tape head 10 has been referred to as a magnetic recording tape head, it is within the scope of the invention to utilize the techniques of the present invention in other types of heads. Similarly, although tape head 10 is of an interleaved type where read tracks 28 are interleaved with write tracks 29, a read tape head having read tracks 28 only or write tracks 29 only may advantageously employ the present invention. Furthermore, although read tracks 28 and write tracks 29 are shown as the type that are deposited on gap side surface 18 of substrate 14, it is within the scope of the invention to have gap side surface 18 configured to receive recessed read tracks 28 and/or write tracks 29. In addition, while certain dimensions and spacing for gluing vias are disclosed in the preferred embodiment, the invention should not be limited to such dimensions and spacing as the claimed method and apparatus may be advantageously employed in many applications as would be apparent to one skilled in the art.

What is claimed is:

1. A magnetic recording head for at least one of reading from and writing to a medium moving across the head, comprising:
   a substrate;
   a closure separated from said substrate by a gap, said closure including a C-core;
   thin film layers deposited on said substrate to form a plurality of read and write heads, a first end of said read and said write heads being located adjacent said medium moving across said head;
   a plurality of gluing vias formed between the substrate and closure on each side of each read and write head, said plurality of gluing vias intersecting said C-core and a subset of gluing vias formed in a side surface of at least one said substrate and said closure that are located between adjacent ones of said plurality of read and write heads and extending exclusively from said C-core to said first end of said read and write heads; and
   adhesive inserted into said plurality of gluing vias and said C-core for securing said substrate to said closure.

2. A magnetic recording head according to claim 1, wherein said thin film layer comprises a recording track layer.

3. A magnetic recording head according to claim 2, wherein said recording track layer comprises at least one of a read track and a write track.

4. A magnetic recording head according to claim 3, wherein at least one of said gluing vias are trenched on said side surface of said substrate between said at least one of a read track and a write track.

5. A magnetic recording head according to claim 1 wherein said gluing vias are photolithographically defined and subsequently trenched on said side surfaces.

6. A magnetic tape head for reading from and writing to a magnetic tape moving across the head, comprising:
   a substrate having a gap side surface;
   a closure having a gap side that opposes and separated from said gap side surface of said substrate by a gap, said closure including a C-core;
   thin film layers deposited on said gap side surface of said substrate in said gap to form a plurality of read and write heads, a first end of said read and write heads being located adjacent said magnetic tape moving across said head;
   a plurality of gluing vias on each side of each read and said write head formed on a nonplanar topography;
   a subset of gluing vias on at least one of said substrate and said closure that are located between adjacent ones of said plurality of read and said write heads and extent exclusively from said C-core to said first end of said read and write heads; and
   adhesive inserted in said gap, said gluing vias, and said C-core said subset of gluing vias.

7. A magnetic tape head according to claim 6, wherein said thin film layer comprises a recording track layer.

8. A magnetic tape head according to claim 7, wherein said recording track layer comprises at least one of a read track and a write track.

9. A magnetic tape head according to claim 8, wherein at least one of said gluing vias are trenched on said side surface of said substrate between said at least one of a read track and a write track.

10. A magnetic tape head according to claim 6 wherein said gluing vias are photolithographically defined and subsequently trenched on at least one of said gap side surfaces of said substrate and said closure.

* * * * *